United States Patent
McKenney et al.

(10) Patent No.: US 7,257,799 B2
(45) Date of Patent: Aug. 14, 2007

(54) FLEXIBLE DESIGN FOR MEMORY USE IN INTEGRATED CIRCUITS

(75) Inventors: Douglas J McKenney, Eden Prairie, MN (US); Steven Mark Emerson, Chanhassen, MN (US)

(73) Assignee: LSI Corporation, Milpitas, CA (US)

( * ) Notice: Subject to any disclaimer, the term of this patent is extended or adjusted under 35 U.S.C. 154(b) by 608 days.

(21) Appl. No.: 10/713,492

(22) Filed: Nov. 14, 2003

(65) Prior Publication Data

US 2005/0108495 A1   May 19, 2005

(51) Int. Cl.
G06F 17/50    (2006.01)
(52) U.S. Cl. ........................................ 716/16
(58) Field of Classification Search ............ 716/16–17, 716/4
See application file for complete search history.

(56) References Cited

U.S. PATENT DOCUMENTS

| | | | | |
|---|---|---|---|---|
| 6,538,468 B1 * | 3/2003 | Moore | ......................... | 326/40 |
| 6,640,333 B2 * | 10/2003 | Hamlin | ......................... | 716/16 |
| 6,748,577 B2 * | 6/2004 | Bal | ......................... | 716/16 |
| 6,769,107 B1 * | 7/2004 | Watkins | ......................... | 716/16 |
| 6,772,230 B2 * | 8/2004 | Chen et al. | ......................... | 710/8 |
| 6,779,168 B2 * | 8/2004 | Hamlin | ......................... | 716/16 |
| 6,966,044 B2 * | 11/2005 | Reuland et al. | ......................... | 716/17 |
| 7,000,165 B1 * | 2/2006 | Asson et al. | ......................... | 714/733 |
| 7,007,264 B1 * | 2/2006 | Baxter | ......................... | 716/18 |
| 2001/0010073 A1 * | 7/2001 | Janik et al. | ......................... | 712/218 |
| 2003/0131335 A1 * | 7/2003 | Hamlin | ......................... | 716/16 |
| 2004/0025136 A1 * | 2/2004 | Carelli | ......................... | 716/17 |
| 2004/0040005 A1 * | 2/2004 | Carison | ......................... | 716/8 |
| 2004/0060031 A1 * | 3/2004 | Cernea | ......................... | 716/16 |
| 2004/0111690 A1 * | 6/2004 | Reuland et al. | ......................... | 716/17 |
| 2004/0139415 A1 * | 7/2004 | Hamlin | ......................... | 716/16 |

* cited by examiner

Primary Examiner—Stacy A Whitmore

(57) ABSTRACT

A method for designing and using a partially manufactured semiconductor product is disclosed. The partially manufactured semiconductor product, referred to as a slice, contains a fabric of configurable transistors and at least an area of embedded memory. The method contemplates that a range of processors, processing elements, processing circuits exists which might be manufactured as a hardmacs or configured from the transistor fabric of the slice. The method then evaluates all the memory requirements of all the processors in the range to create a memory superset to be embedded into the slice. The memory superset can then be mapped and routed to a particular memory for one of the processors within the range; ports can be mapped and routed to access the selected portions of the memory superset. If any memory is not used, then it and/or its adjoining transistor fabric can become a landing zone for other functions or registers or memories.

20 Claims, 13 Drawing Sheets

FLEXIBLE DESIGN FOR MEMORY USE IN INTEGRATED CIRCUITS

CROSS REFERENCE TO RELATED APPLICATIONS

The present application is related to the following United States patent applications, which are hereby incorporated by reference in their entireties: copending U.S. Ser. No. 10/318,623 filed 13 Dec. 2002 entitled AUTOMATED SELECTION AND PLACEMENT OF MEMORY DURING DESIGN OF AN INTEGRATED CIRCUIT; U.S. Ser. No. 10/318,792 filed 13 Dec. 2002 entitled FLEXIBLE TEMPLATE HAVING EMBEDDED GATE ARRAY AND COMPOSABLE MEMORY FOR INTEGRATED CIRCUITS; copending U.S. Ser. No. 10/334,568 filed 31 Dec. 2002 entitled PLACEMENT OF CONFIGURABLE INPUT/OUTPUT BUFFER STRUCTURES DURING DESIGN OF INTEGRATED CIRCUITS; copending U.S. Ser. No. 10/335,360 filed 31 Dec. 2002 entitled A SIMPLIFIED PROCESS TO DESIGN INTEGRATED CIRCUITS; copending U.S. Ser. No. 10/435,168 filed 8 May 2003 entitled AUTOMATION OF THE DEVELOPMENT, TESTING, AND RELEASE OF A FLOW FRAMEWORK AND METHODOLOGY TO DESIGN INTEGRATED CIRCUITS; and copending U.S. Ser. No. 10/465,186 filed 19 Jun. 2003 entitled DESIGNING AND TESTING THE INTERCONNECTION OF ADDRESSABLE DEVICES OF INTEGRATED CIRCUITS.

FIELD OF THE INVENTION

This invention relates generally to the field of electronic circuit design and more particularly relates to developing a design template for maximum flexibility of implementation and interchange of memory blocks during the design and development of integrated circuits.

BACKGROUND

Integrated circuits comprise many transistors and the electrical interconnections between them. Depending upon the interconnection topology, transistors perform Boolean logic functions like AND, OR, NOT, NOR and are referred to as gates. Some fundamental anatomy of an integrated circuit will be helpful for a full understanding of the factors affecting the flexibility and difficulty to design an integrated circuit. An integrated circuit comprises layers of a semiconductor, usually silicon, with specific areas and specific layers having different concentrations of electron and hole carriers and/or insulators. The electrical conductivity of the layers and of the distinct areas within the layers is determined by the concentration of ions called dopants that are implanted into these areas. In turn, these distinct areas interact with one another to form the transistors, diodes, and other electronic devices. These devices interact with each other by electromagnetic field interactions or by direct electrical interconnections. Openings or windows are created for electrical connections through the layers by an assortment of processing techniques including masking, layering, and etching additional materials on top of the wafers. These electrical interconnections may be within the semiconductor or may lie above the semiconductor areas using a complex mesh of conductive layers, usually of metal such as aluminum, tungsten, or copper fabricated by deposition on the surface and then selectively removed. Any of these semiconductor or connectivity layers may be separated by insulative layers, e.g., silicon dioxide.

Integrated circuits and chips have become increasingly complex with the speed and capacity of chips doubling about every eighteen months because of the continuous advances in design software, fabrication technology, semiconductor materials, and chip design. An increased density of transistors per square centimeter and faster clock speeds, however, make it increasingly difficult to design and manufacture a chip that performs as actually desired. Unanticipated and sometimes subtle interactions between the transistors and other electronic structures may adversely affect the performance of the circuit. These difficulties increase the expense and risk of designing and fabricating chips, especially those that are custom designed for a specific application. The demand for complex custom designed chips has increased along with the demand for applications and products incorporating microprocessors, yet the time and money required to design chips have become a bottleneck to bring these products to market. Without an assured successful outcome within a specified time, the risks have risen with the costs, and the result is that fewer organizations are willing to attempt the design and manufacture of custom chips.

More powerful specialized software electronic design automation (EDA) tools intended to design chips correctly and efficiently have been introduced to meet the challenge. As the software tools evolve, however, the tools themselves have become increasingly complex requiring extensive expertise to master and use them. Correspondingly, the costs of staffing, training, and coordinating the various aspects of chip design have also increased. One general response to this dilemma has been a call for what are termed "higher levels of abstraction," which simply means that the logical entities with which designers work are standardized and encapsulated into "black boxes" or modules. Some of the EDA tools, however, are so complex that it is difficult to adapt them to this higher level of abstraction. Customer needs and specifications must be aligned with tools and capabilities of both designers and fabrication facilities having their own design rules, equipment, molds, recipes and standards that have myriad implications for the final work and, for best practices, must be considered early in the process.

Meanwhile, several types of chips have been developed that have modules or blocks of transistors that are partly fixed and partly programmable and/or customizable. The utility of these modular chips is determined by factors such as complexity, cost, time, and design constraints to create functional electronics from these generic blocks of transistors. Field programmable gate array (FPGA) refers to a type of logic chip that can be easily reprogrammed in the field with trivial modifications. FPGAs, however, are very large and expensive having relatively high cost per function, relatively low speed, and high power consumption. FPGAs are used primarily for prototyping integrated circuit designs and once a design is set, faster hard-wired chips are produced. Programmable gate arrays (PGAs) are also flexible in the numerous possible applications that can be achieved but not quite as flexible as the FPGAs, and require more time to modify and test. An application specific integrated circuit (ASIC) is another type of chip designed for a particular application. ASICs efficiently use power compared to FPGAs and are quite inexpensive to manufacture at high volumes. ASICs, however, are very complex to design and prototype because of their speed and quality. Application specific standard products (ASSPs) are hard-wired chips that meet a specific need but this customization is both extremely time-consuming and costly. An example of an ASSP might be a microprocessor in a heart pacemaker.

Consistent with the goal to achieve the higher levels of abstraction, a difficult optimization and construction problem is that of constructing internal memory arrays required for many distinct designs. Integrated circuits, moreover, may have either an embedded or external processor connected to various registers and memory, either or both of which may be located on or off-chip. On-chip, these registers and memories may be logically and/or physically arranged in various modules that may be read and written by the processor through memory-mapped accesses connecting the registers/memory and the processor using at least one internal bus. Today, chip designers and testers manually define the specification and address map for individual registers and internal memory, as well as separately and manually specify the register transfer logic (RTL) implementation, the verification testcases, and the firmware header file. This approach is time-consuming, tedious, and prone to errors created by manual editing. Maintaining consistency and accommodating the many minute changes is very difficult.

Because the invention herein allocates memory in an integrated chip, it may be useful to present a brief discussion of how memory is used in semiconductor products. Memories are a collection of elements having a defined and repeatable purpose; if addressable, each element of the memory can be individually accessed by an address. Memories may be configured as "read-only" in that the memory stores a value indicating, e.g., a state or status. A memory may also be a "read-write" memory meaning that the value stored in the element may be observed and modified. A memory may also be a "write-only" memory meaning that the address associated with the memory element monitors an internal change but the values cannot be observed. Writing to a memory, moreover, may store or set bits to a particular value in the memory; or writing may clear bits or values within the memory. Setting or clearing bits within a memory may further trigger a counter that may affect an operation elsewhere on the integrated circuit when a threshold value in the counter is reached.

In addition to the above capabilities, it is often convenient to specify that a memory be allocated to be a control register connected to deeper internal logic of the configurable integrated circuits. An example of a control register is the counter. As internal events occur, the counter changes values. Another specialized memory is the status register whose bits are also driven by internal events. A status register is often associated with a mask register. The combination of a status and a mask register may produce a single output bit when both an internal signal and a mask/enable bit are set. Another specialized memory is the most significant bit (MSB) register. When a combination of a mask/enable bit and a status bit are arranged in priority order the MSB register can be read to determine the offset of the most significant bit that is set and enabled. Such specialized registers are not easily implementable or testable and may be referred to as performance-enhancing registers. One of skill in the art, moreover, will recognize that the above descriptive use of memories is not intended to be all-inclusive, but rather to merely provide examples of how memories and registers are used in an integrated circuit or semiconductor product.

Multiple memory blocks or modules may be part of the complex functions embedded in cell-based logic or base transistors as custom logic. Because it is embedded, this fixed logic cannot be changed without a complete respin of the silicon device even though the specific complex function realizable by that logic may not be desired and/or used in the semiconductor product. If this is the case, the effort, development, and area of the chip was wasted because the custom logic cannot be reused.

There is thus a need in the industry to increase the reliability and the flexibility of the design process and use of addressable and internal memories after manufacture within a semiconductor product yet at the same time reduce the cost of each individual design.

SUMMARY OF THE INVENTION

To satisfy the above needs and to realize further advantages, the inventors herein present a method to design an integrated semiconductor product, comprising the steps of inputting a description of one processing function within an entire set of processing functions into a slice a transistor fabric, and/or at least one hardmac memory; determining if the those processors in the range of processing functions have different memory requirements; and determining the superset of memories and memory sizes, i.e., a largest common memory, that can satisfy all the memory requirements of all processors in the range of processing functions. The method further contemplates embedding the largest common memory into the at least one hardmac memory into the slice, and/or embedding at least one processor embodiment of the range of processing functions into the slice. Register transfer logic may be generated so that one of the range of processing functions can use a first portion of the largest common memory. Additional register transfer logic may comprise logic for a port to access the first portion of memory used by one of the processors. The common memory may be configured to be an instruction cache and/or a tag/address register for instructions in the instruction cache and/or a valid register indicating valid and/or invalid instructions in the instruction cache. Alternatively, or in addition, a portion of the largest common memory may be configured to be a data cache and/or a tag/address register for data in the data cache, and/or a valid register indicating which data in the data cache is or is not valid. A portion of the largest common memory to be used by one of the range of processing functions could be mapped and routed as a tightly coupled memory.

If any portion of the largest common memory is not used by any of the processors in the range, then that portion could be identified; register transfer logic could be generated to create from the transistor fabric a processor circuit not included in the range; register transfer logic could create an additional register and/or memory from the second portion of the largest common memory as well as interconnect register transfer logic to connect the additional register and or memory to the processor circuit not included in the range of processors. Of course, the interconnect and the generated register transfer logic would be added to the slice description.

The inventors further contemplate an article of manufacture, comprising a data storage medium tangibly embodying a program of machine readable instructions executable by an electronic processing apparatus to perform method steps for operating an electronic processing apparatus, said method steps comprising the steps of: reading a plurality of input files relating to a plurality of embodiments of processing functions that could be incorporated into a design of a partially manufactured semiconductor product having a transistor fabric; determining the largest common superset of memory that can be used by all of the plurality of embodiments of the processing function; embedding the superset of memory into the design of the partially manufactured semiconductor product; generating a plurality of output files to configure the embedded memory superset for use by a selected embodiment of the plurality of processing functions; and updating the design of the partially manufactured semiconductor product with the output files. The output files could contain logic to tie off any portion of the embedded memory superset not used by the selected embodiment of the plurality of processing functions. The output files could also comprise logic to convert a portion of the transistor fabric to access the embedded memory superset used by the selected embodiment of the plurality of processing functions.

Given a partially manufactured semiconductor product having a transistor fabric and embedded with a memory superset capable of satisfying the memory/register requirements of all of a range of processing functions, it could be configured by selecting one processing function from the range of processing functions, and then determining how the memory superset is to be apportioned to the selected one processing function, then apportioning the memory superset and tying off that portion of the memory superset that is not apportioned, determining how to access the apportioned memory superset and then creating logic within the transistor fabric to access the apportioned memory superset.

The invention is also a partially manufactured semiconductor product, comprising: a plurality of functional areas, at least one of the functional areas embedded into the semiconductor product as a configurable superset of semiconductor memory and at least another of the functional areas reserved for one of a range of processing circuits, each one of the range of processing circuits capable of using all or a portion of the configurable superset of semiconductor memory; configuration logic capable of fulfilling a memory/register requirement of at least one of the range of processing circuits from the configurable superset of semiconductor memory; and port logic capable of accessing the memory/register requirement fulfilled from the configurable superset of semiconductor memory.

BRIEF DESCRIPTION OF THE DRAWINGS

The numerous advantages of the present invention may be better understood by reference to the accompanying figures in which.

DESCRIPTION OF THE INVENTION

Figure 1:
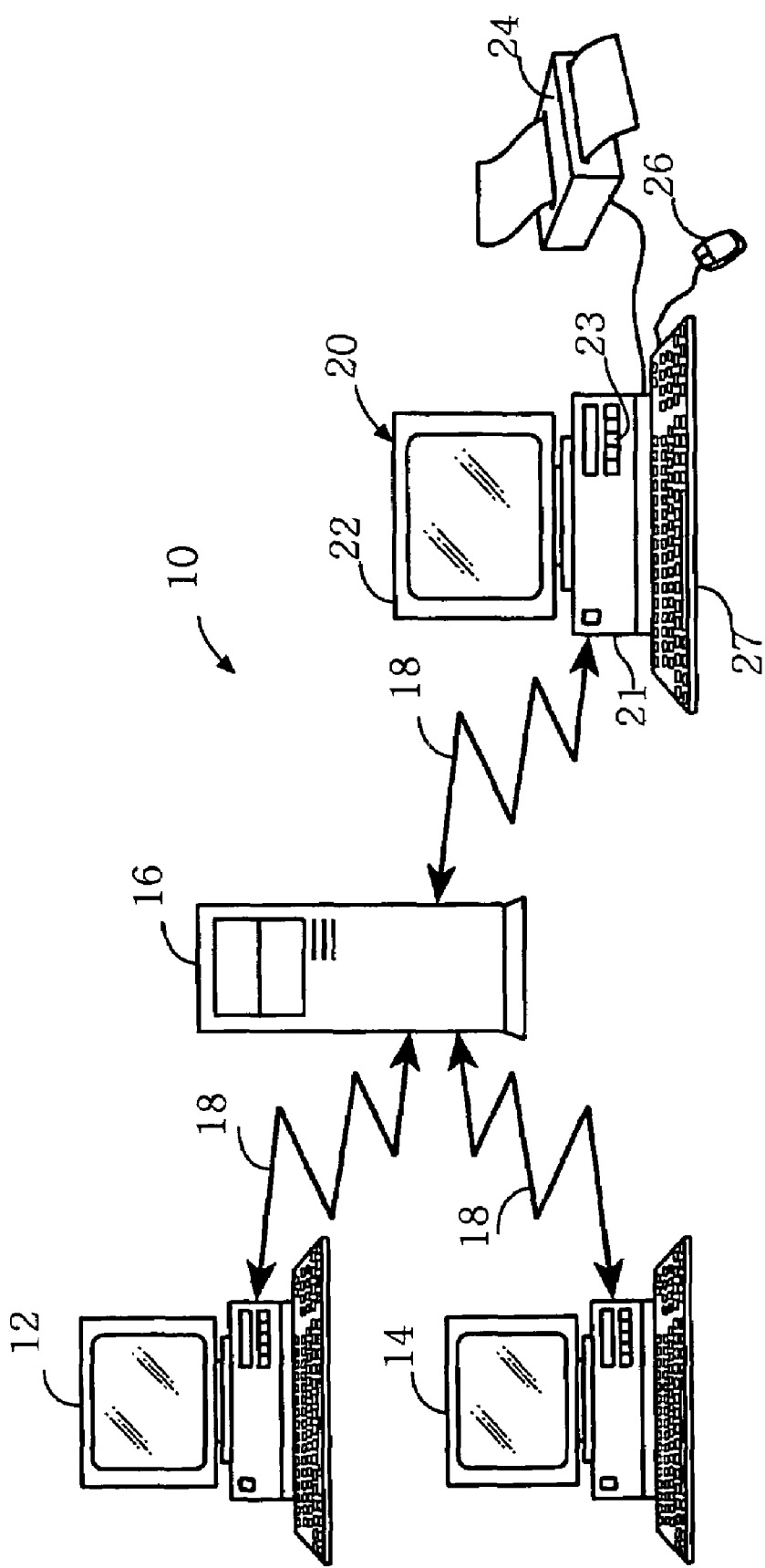
FIG. 1 is a simplified block diagram of a networked computer system in which the method and the tool of the invention can be implemented.

Referring to the drawings, FIG. 1 illustrates an exemplary computer system 10 upon which a register/memory allocation tool as disclosed herein could be installed and/or used. Computer system 10 is illustrated as a networked computer system that includes one or more client computers 12, 14 and 20 such as workstations coupled through a network 18 to a server 16. Server 16 could also be a personal computer, a workstation, a midrange computer, or a mainframe computer. While shown here as a point-to-point connection, computers 12 and 14 need not be coupled to server 16 directly, but may be coupled to yet another network which in turn is connected to server 16. Network 18 represents any type of networked interconnection including but not limited to local-area, wide-area, wireless, and public networks such as the Internet or an Intranet, and any number of routers and hubs connected in between, e.g., a local-area network to a wide-area network to the Internet through a series of routers and/or other servers. Any number of computers and other devices may be networked through network 18, e.g., multiple servers, hand-held devices, etc.

For the purposes of the invention, computer 20 may represent practically any type of computer, computer system, or other programmable electronic device, including a client computer similar to computers 12, 14 and 20 of FIG. 1, a server computer, e.g., similar to server 16 of FIG. 1, a portable computer, an embedded controller, a hand-held device, etc. Computer 20 may be coupled in a network as shown in FIG. 1 or may be a stand-alone device. Computer 20 will hereinafter also be referred to as a computer although it should be appreciated that the term "computer" may also include other suitable programmable electronic devices capable of allowing a chip designer to use the generation tool.

Computer 20 typically receives a number of inputs and outputs for communicating information externally. For interface with a user or operator, computer 20 typically includes one or more user input devices 26, 27, e.g., a keyboard, a mouse, a trackball, a joystick, a touchpad, and/or a microphone, among others, and a display 22 such as a CRT monitor, an LCD display panel, and/or a speaker, among others. Some servers, however, do not support direct user input and output. For additional storage, computer 20 may also include one or more storage devices 36, e.g., a floppy or other removable disk drive, a hard disk drive, a direct access storage device, an optical drive, e.g., a CD drive, a DVD drive, etc., and/or a tape drive, among others, that may be connected directly or may be connected through a storage area network (SAN) or other network. Furthermore, computer 20 may include an interface connected to one or more networks 18, e.g., a local-area network, a wide-area network, a wireless network, and/or the Internet, among others, to permit communication of information with other computers coupled to the network. It should be appreciated that computer 20 typically includes suitable analog or digital interfaces between processor 30 and each of the components 18, 22, 26, 27, and 36 as is known in the art.

Figure 2:
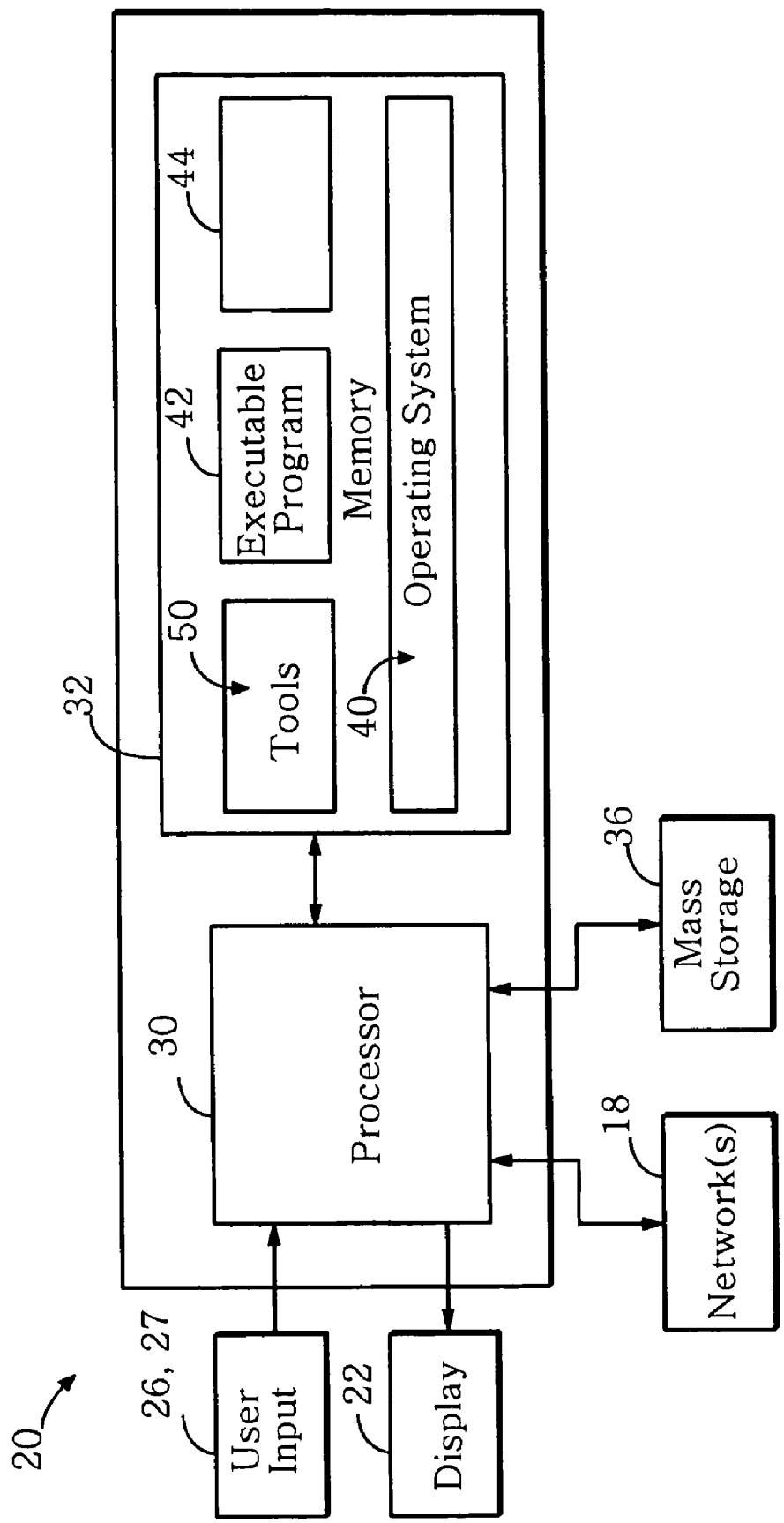
FIG. 2 is a simplified block diagram of the functional components within a computer workstation to which an integrated circuit developer may access and use the memory allocation tool in accordance with an embodiment of the invention.

With reference to FIG. 2 wherein the method and apparatus of flexibly allocating internal memories and/or registers of a semiconductor product during design as disclosed herein is installed as an application called the memory allocation tool on computer 20. Computer 20 typically includes at least one processor 30 coupled to a memory 32. Processor 30 may represent one or more processors or microprocessors and memory 32 may represent the random access memory (RAM) devices comprising the main storage of computer 30, as well as any supplemental levels of memory such as cache memories, nonvolatile or backup memories, programmable or flash memories, read-only memories, etc. In addition, memory 32 may be considered to include memory storage physically located elsewhere in computer 30, e.g., any storage capacity used as a virtual memory, e.g., as stored on a mass storage device 36 coupled to computer 20 with a SAN or on another computer coupled to computer 20 via network 18.

Computer 20 may operate under the control of an operating system 40 such as a UNIX-based or WINDOWS-based operating system, as is known in the art, but is not so limited by the particular operating system, or indeed need not be under the control of any operating system. Operating system 40 typically executes various computer software applications, components, programs, objects, modules, etc., such as an executable program 42, etc. Although the memory allocation tool 50 may be in memory 32 for the purpose of developing an integrated circuit, it need not be. The processor 30 may access the memory allocation tool 50, the required data, other various applications components, programs, objects, modules, etc., resident on one or more processors in another computer coupled to computer 20 via a network 18, e.g., in a distributed or client-server computing environment whereby the processing to implement the functions of the memory allocation tool may be allocated to multiple computers over a network.

In general, the memory allocation tool executed to implement the embodiments of the invention whether implemented as part of an operating system or a specific application, component, program, object, module, or sequence of instructions will be referred to herein as the flexible memory allocation tool or simply, the memory allocation tool. The flexible memory allocation tool typically comprises one or more instructions that are resident at various times in various memory and storage devices in a computer, and that, when read and executed by one or more processors in a computer network, cause that computer to perform the steps necessary to execute steps or elements embodying the various aspects of the invention. While the invention has and hereinafter will be described in the context of fully functioning computers and computer systems, those skilled in the art will appreciate that the various embodiments of the invention are capable of being distributed as a program product in a variety of forms and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks, e.g., CD-ROMs, DVDs, etc., among others, and transmission type media such as digital and analog communication links. It should be appreciated that any particular nomenclature that follows is used merely for convenience, and thus the invention should not be limited in its use solely to any specific application identified and/or implied by such nomenclature. The exemplary environments illustrated in FIGS. 1 and 2 are not intended to limit the present invention. Indeed, those skilled in the art will recognize that other alternative hardware and/or software environments may be used without departing from the scope of the invention.

Figure 3:
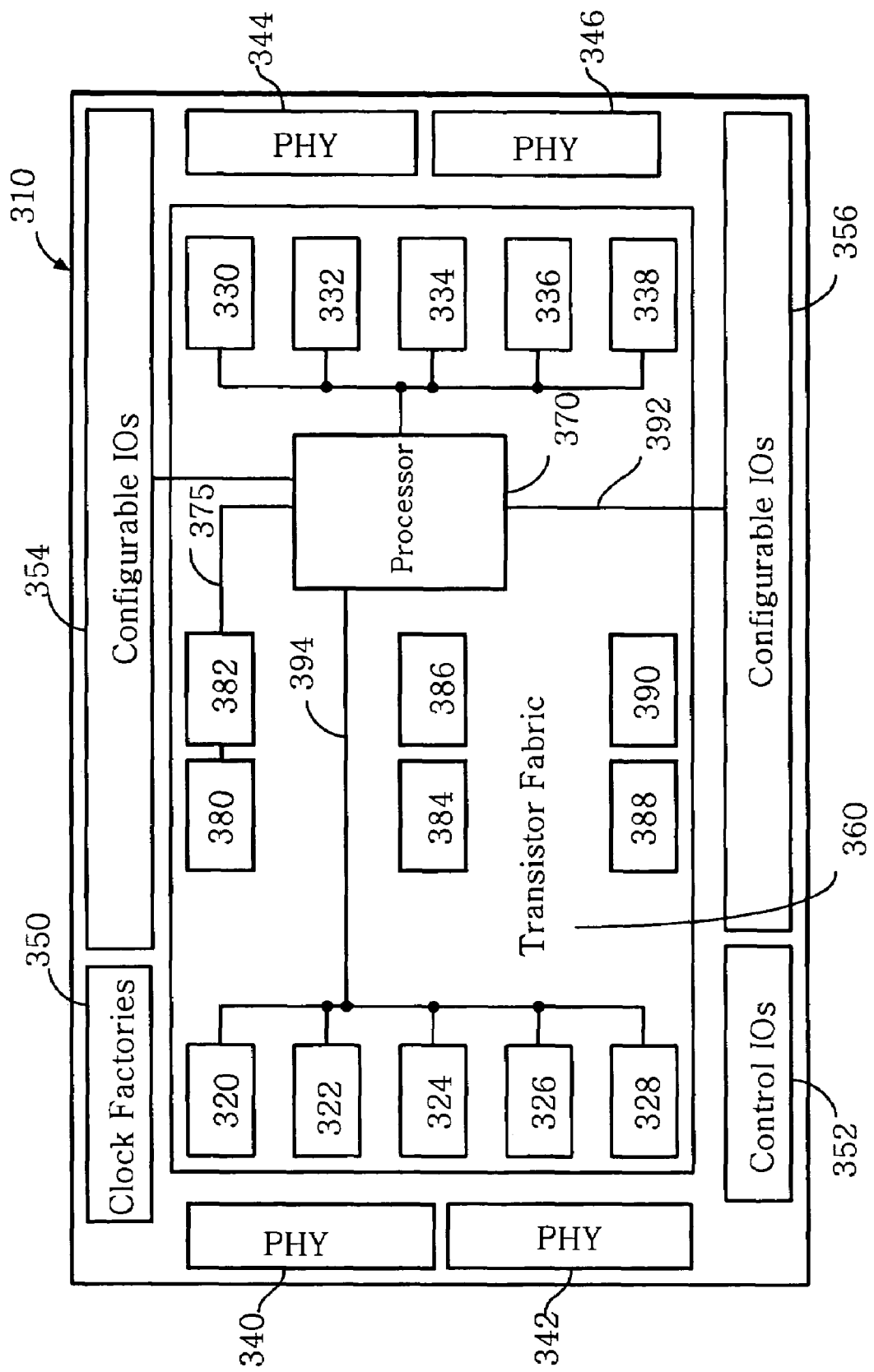
FIG. 3 is a simplified block diagram of a semiconductor slice from which the memory allocation tool could allocate memory of an integrated circuit in accordance with an embodiment of the invention.

Viewing FIG. 3, a slice 310 is a partially manufactured semiconductor device in which the wafer layers up to the connectivity layers have been fabricated. The slice 310 comprises a base semiconductor wafer from, e.g., silicon, silicon-on-insulator, silicon germanium, gallium arsenide, other Type II, IIII, IV, and V semiconductors, etc. and is a piece of semiconductor material into which hardmacs have been diffused into the semiconductor layers. Diffusing a semiconductor wafer to create a hardmac simply means that during fabrication of the wafer layers, transistors or other electronic devices have been particularly and permanently embedded or otherwise arranged in the wafer layers to achieve specific functions, such as diffused memory 320-338, 380-390, data transceiver hardware such as I/O PHYs 340-346, clock factories including phase locked loops (PLLs) 350, control I/Os 352, configurable input/output (I/O) hardmacs 354, 356; each of the hardmacs have an optimum density, arrangement, and routing of transistors for its particular function. The slice further comprises a gate array of transistors, called transistor fabric 360, for further development. Transistor fabric 360 is an array of prediffused transistors in a regular pattern that can be logically configured by configuring the metal layers interconnecting the transistors by a suite of generation tools, such as those related patent applications referenced and incorporated by reference into; inter alia, memories and/or registers. The memory allocation tool herein then facilitates the use and optimization of those registers and/or memories. The slice may also comprise at least one, probably several, configurable I/Os 354, 356 built on the transistor fabric 360. The slice 310 preferably includes an embedded processor 370 that may be connected to other components of the slice on a bus network 375. Rather than or in addition to an embedded processor 370, the slice may be connected to an external processor through one of the slice's configurable I/Os 354, 356. Whether external and/or internal, the processor may further be connected to registers and memory, either or both of which may be located on or off-chip. These registers and memories, moreover, may be logically and physically arranged in modules throughout the integrated circuits, and indeed, that is the subject of the invention herein—the optimal creation and diffusion of a memory superset for the maximum flexibility given possible processing functions that could be implemented on the slice. Preferably, some of the registers and/or memories are connected together using at least one internal bus, and are read and written by the processor and other devices through memory-mapped accesses. The term "bus" within the context of the application herein shall be construed to mean a defined set of signals that provide for masters to initiate read and write operations directed to one or more slave interfaces that respond based on commands and address ranges. A bus is usually implemented as unidirectional using a multiplexed-datapath type of interconnect topololgy. An example of an internal bus may be an AHB, an AHB-LITE, an APB, or other industry standard internal bus, and may be 32 or 64 bits or more wide. Those of skill in the art will appreciate that the internal bus of the slice may not be limited to the above types nor limited to the width nor bus speeds of the above-specified buses.

The slice definition thus is a detailed listing of all the features available on the slice, such as the transistor fabric, a specification of a processor or processing element or processing circuit, the configurable and/or hardmac I/O and memory available, the requirements of the configurable and hardmac I/Os, an internal bus specification, the cost of the slice, the ideal performance that can be expected of the slice, the expected power consumption, and other functional requirements. The slice 310 shown in FIG. 3 is only one example of a slice and its components. Different slices may contain different amounts of transistor fabric, different amounts and types of diffused and/or compiled memories, different types of fixed and configurable I/O blocks, different types and amounts of I/O hardmacs, processors, clocks, etc. depending upon the purpose of the final integrated chip. For instance, if the final chip is intended to be a communication and/or networking integrated circuit, the periphery of the slice may contain many I/O blocks that have been fixed as PHYs and/or that can be configured differently from one another. The slice 310, moreover, optionally may include the contact mask and some of the fixed higher layers of connectivity for distribution of power, ground, and external signal I/O. A cell refers to the personalization of the interconnect layers that instantiate the logic gates of the transistor fabric 360.

The slice itself is of little use to a designer needing to develop register transfer logic (RTL), so some representation of the diffused resources of the slice is needed. A logic infrastructure is required to make the slice useful as a design entity. The collection of RTL logic are categorized into "shells" and include a documentation shell, a verification shell, a synthesis shell, a static timing analysis shell, and a manufacturing test shell, all of which provide input and/or contain output from the memory allocation tool. The RTL shell provides a logical description of an aspect of the slice or of the generated or used resources. The documentation shell may be considered the functional description of the resources. The verification shell is the functional verification description, whereas the synthesis shell may be thought of as the generation description. The static timing analysis shell is the timing description, the manufacturing test shell is the test description, and the floorplan shell is a description of the location of the slice resources. Additional shells may include the floorplan shell and the RTL qualification shell.

The invention as described herein then specifies a generic slice and its accompanying logic or shells for maximum flexibility to allocate memory blocks for multiple processors, a single processor, processing elements, processing circuits, herein simply referred to as processors or processing functions. Preferably, the processors are similar and can take advantage of a similar set of memory blocks. The memory block superset or common memory is the largest common denominator, i.e., memory and memory sizes, that can satisfy all memory requirements across all processors that can be mapped on the slice. This memory block set is then embedded in the base layers of the silicon device as hardmacs and mapped or routed using the largest common denominator of logic shell. The result is that the semiconductor, typically silicon, area is not "locked-down" until after the slice has been manufactured, i.e., during metallization. In the examples given, the generic processors may or may not have a data and/or an instruction cache. The processor may be created from the transistor fabric, may be created as a hardmac generated during manufacture of the slice, or may be external to the slice and then connected to the semiconductor product. Rather than creating a specific memory for each different processor, a generic memory superset is embedded in the slice for a range of processors. Then the memory and logic are particularly mapped to a specific processor using the transistor fabric and the shells, as explained below and in the copending patent applications incorporated by reference at the beginning of this application.

By way of illustration only, below is a table of processors/processing elements known to be implemented in various semiconductor products, each processor having different memory requirements. The invention as disclosed herein, then evaluates the memory requirements and determines the largest common memory superset to be embedded in the slice that can accommodate all memory requirements of the range of possible processors. The particular memory uses, configurations can be modified with logic and interconnections such as disclosed in U.S. Ser. No. 10/318,623 filed 13 Dec. 2002 entitled AUTOMATED SELECTION AND PLACEMENT OF MEMORY DURING DESIGN OF AN INTEGRATED CIRCUIT and U.S. Ser. No. 10/465,186 filed 19 Jun. 2003 entitled DESIGNING AND TESTING THE INTERCONNECTION OF ADDRESSABLE DEVICES OF INTEGRATED CIRCUITS, incorporated by referenced herein above.

| | Memory Requirement and Size | | | | | | |
|---|---|---|---|---|---|---|---|
| Function | Instruction Tag (4) 440 | Instruction Set (4) 420 | Data Tag (4) 485 | Data Set (4) 450 | Valid (2) 438, 480 | Dirty (1) 482 | MMU 475 |
| Processor 1 | 128 × 22 | 512 × 64 | 256 × 22 | 512 × 64 | 32 × 24 | 128 × 8 | 32 × 128 |
| Processor 2 | 128 × 22 | 1024 × 32 | 128 × 22 | 1024 × 32 | 32 × 24 | 128 × 8 | 32 × 112 |
| Processor 3 | 128 × 20 | 1024 × 32 | 128 × 20 | (8) 512 × 32 | — | 128 × 8 | |
| Processor 4 (no cache) | Uses any 32 bit wide memory on either data or instruction side; then 16 KB is available for instruction or data tightly coupled memory | | | | | | |
| Memory Superset | (4) 128 × 22 | (8) 512 × 32 | (4) 256 × 22 | (8) 512 × 32 | (2) 32 × 24 | 128 × 8 | (4) 32 × 32 |

The column labeled instruction tag requires four memory/register units, the largest of which is 128×22 bits for processors 1 and 2. The instruction cache then requires four memory units and it has been determined that the largest common memory that can most efficiently provide these units across all processors is eight memory units of memory having a size 512×32 bits. The size of the largest data tag is for processor 1 and thus the largest common denominator for a data tag is 256×22 bits. Processors 1 and 2 require a register/memory for valid bits indicating the cached data are/are not valid, thus two memories whose size is 32×24 bits is required. A memory management unit (MMU) is required for the larger processors 1 and 2.

Figure 4:
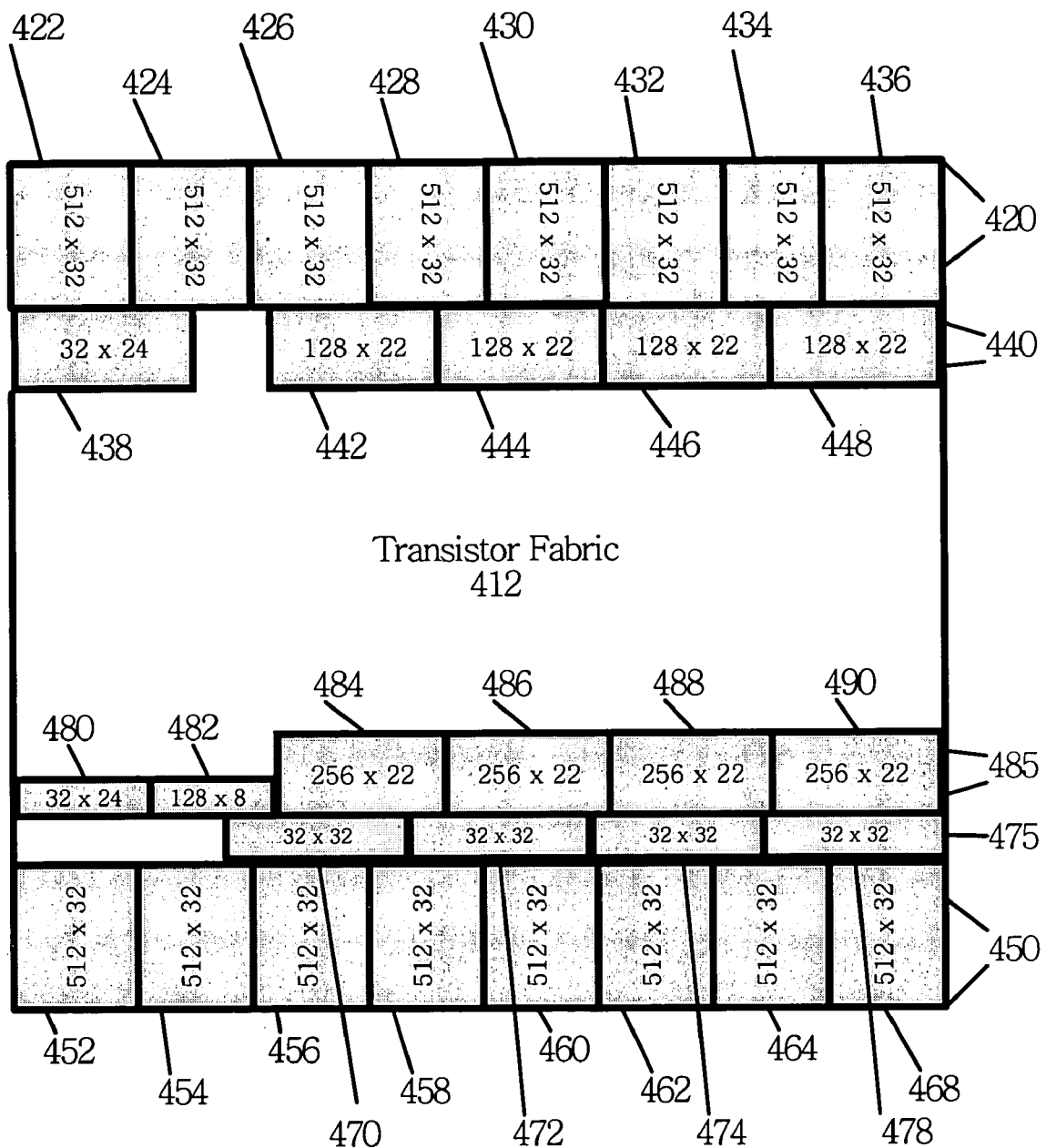
FIG. 4 is a simplified block diagram of a memory superset that could have been determined and allocated by the memory allocation tool in accordance with features of the invention.

Viewing FIG. 4, an example of a portion of a slice 410 having the largest memory subset that can be used for the processors listed in the table, and in particular for both processors 1 and 2, is shown. The embedded memory of eight blocks of memory 422-436, each sized 512×32 bits, pictured above the transistor fabric 412 can be allocated and configured for an instruction cache 420. Memory blocks 442-448, each sized 128×22 bits, can be allocated for the instruction tag set 440. Memory block 438, sized 32×24 bits, can be configured for a valid register of the instruction cache 420. The data cache 450 can also comprise eight memory blocks 452-468, each having a size of 512×32 bits, with blocks 484-490 allocated for the data tags 485. A memory management unit 475 may comprise four blocks of memory 470-478, each 32×32 bits. The valid register for the data cache 450 could be constructed from embedded memory block 482 of 32×24 bits; and a dirty register can be mapped from a memory block 482 of 123×8 bits. Thus, the memory configuration as shown in FIG. 4 can accommodate both processor 1 which might be, for instance, a six stage pipeline processor and processor 2 which might be, for instance, a five stage pipelined processor. The instruction and/or the data cache may be four-way set associative cache, although it is not intended that the possible memory configurations/caches be limited to this particular associativity, size, configuration, etc.

Figure 5A:
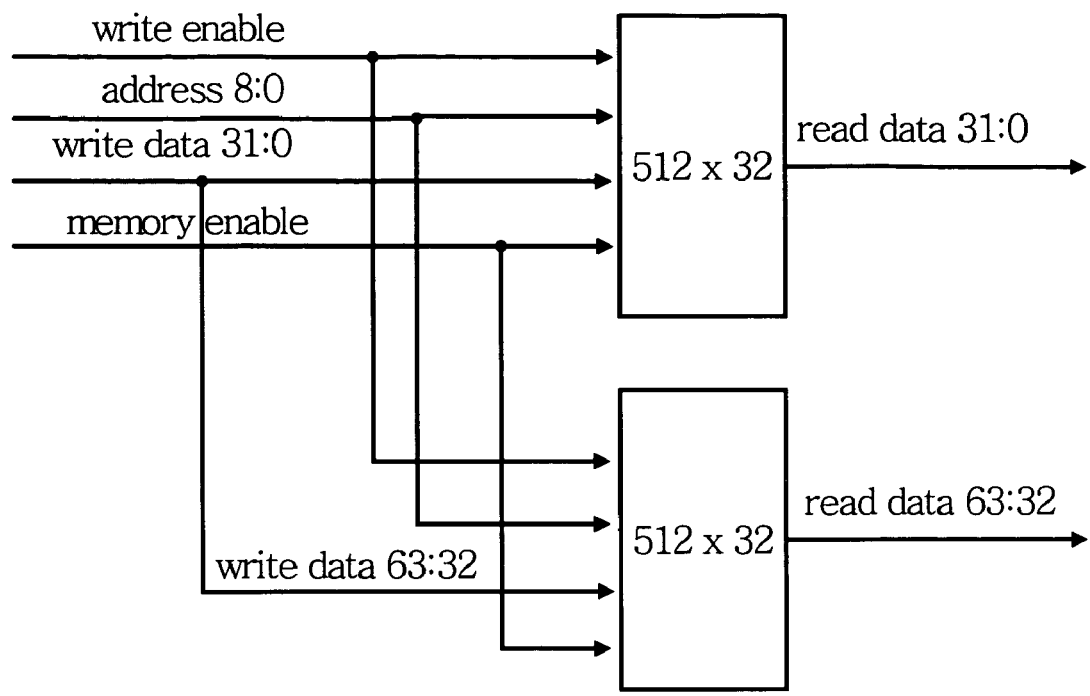
FIGS. 5a and 5b are simplified circuit diagrams of how the transistor fabric of a slice can configure a single port memory of a memory superset into two different multiport memory configurations in accordance with an embodiment of the invention.
Figure 5B:
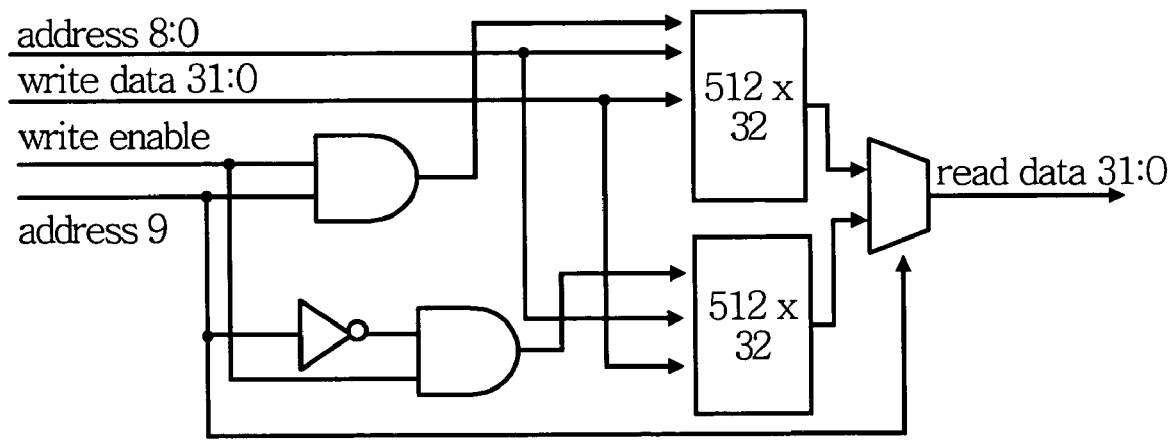

As shown, all memories in this example are single port synchronous memories that have one address bus, a write data input bus, a read data output bus, and a write enable pin(s), but it is understood that the invention is not limited to these memory and bus configurations. Given n-way associativity, a multiport memory can be mapped onto a single memory block by programming the transistor fabric to create multiple read/write ports and then arbitrating between them. Given an embedded single port memory, FIGS. 5a and 5b provide possible logic to access the large single port memory of FIG. 4 for processor 1 and processor 2, respectively. Thus, FIG. 5a is only one logic configuration to write data to different memory, e.g., a wider memory, by storing a portion of the data, e.g., bits 31 through 0 in one memory and the remaining data, bits 63 through 32, in a similar memory. Again, one of skill in the art will appreciate that the size of words, double words, memory presented herein are by way of example only. FIG. 5b shows a logic configuration to allocate two memories as a single memory and how to access that memory as a deeper memory. The logic can be generated from the transistor fabric 412 using one or more of the generation tools co-owned by the assignee herein and incorporated by reference to configure the ports for other memory arrays, such as dual port or multiported, etc. Of course, it is understood by one skilled in the art that other circuits can be configured to access the memory through one or more ports.

Figure 6A:
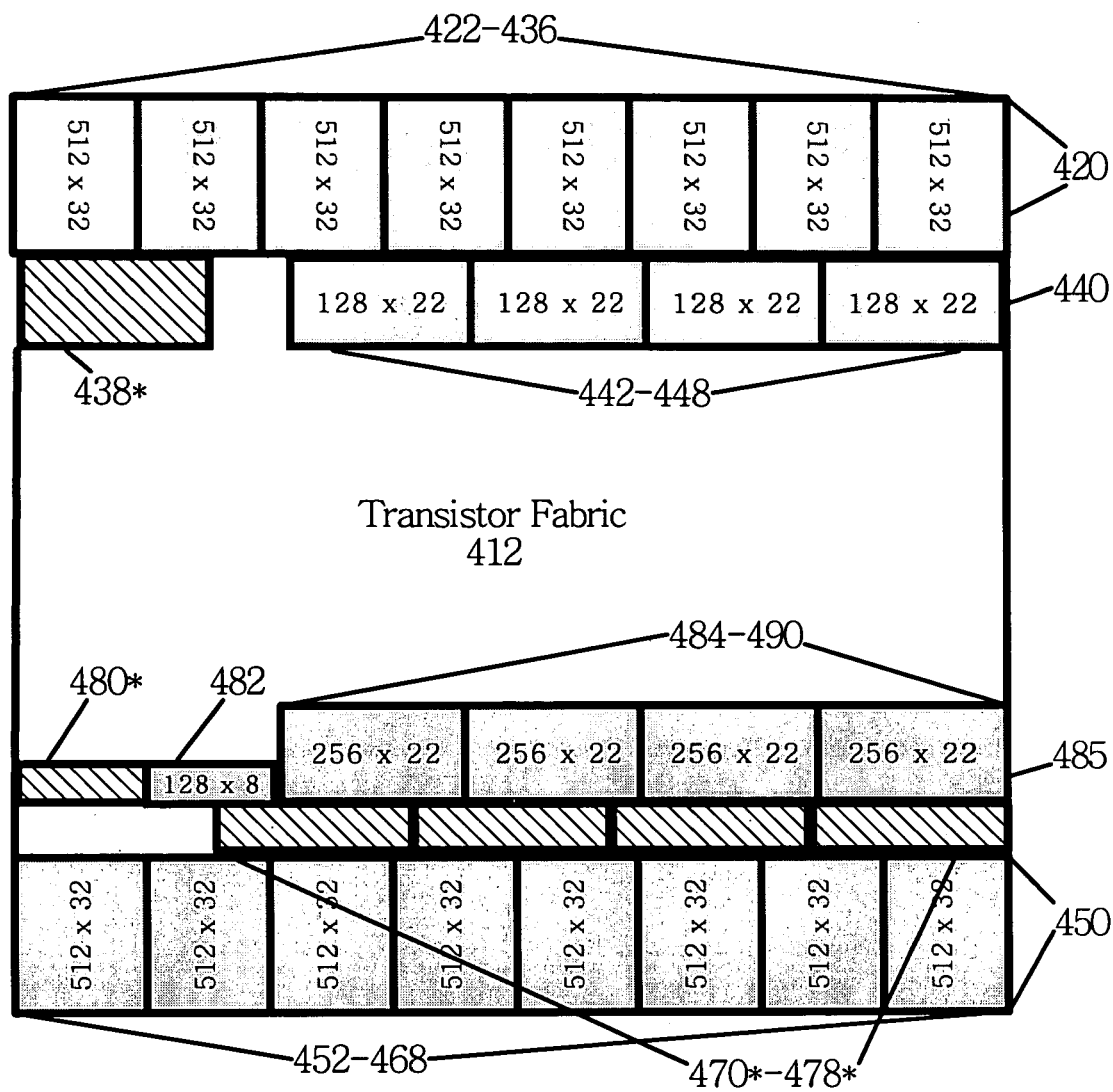
FIGS. 6a and 6b further illustrate how a memory superset can be allocated for a specific processor function and how the transistor fabric can be configured to access the memory in accordance with an embodiment of the invention.
Figure 6B:
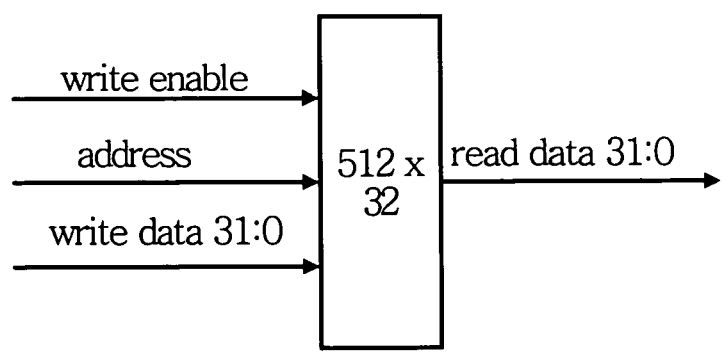

Processor 3 listed in the table above has different memory requirements; it has no need for valid bit registers for both the instruction cache and the data cache; nor does it require a memory management unit. FIG. 6a illustrates how the memory superset of FIG. 4 can be configured to accommodate the memory requirements of processor 3, and in particular shows that memory blocks 438\*, and 470\*, 472\*, 474\* and 478\* are tied off so they are not in use. Thus blocks 422-436 can be mapped to an instruction cache 420 with blocks 442-448 being allocated to the instruction tag set 440. The data tag set 485 can be created from memory blocks 470-478 and, just as before, the data cache 450 can be created from blocks 452-468. A register to indicate the data in the cache 450 may be dirty can be created from memory block 482. FIG. 6b is a possible embodiment of the memory access and address logic that can be configured from the transistor logic 412 to connect to each cache.

Figure 7A:
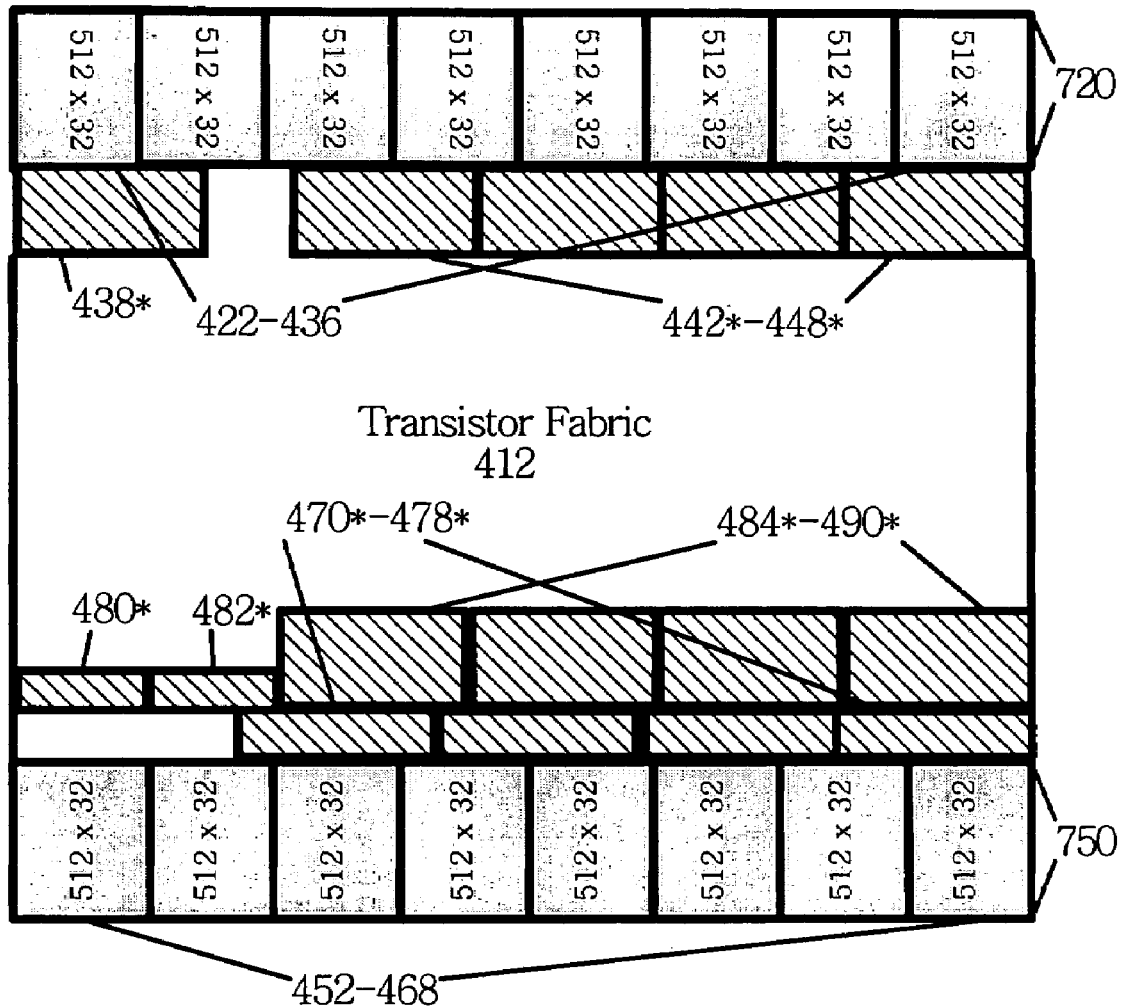
FIGS. 7a and 7b illustrate yet another example of how the memory superset can be allocated for a different processors and how the transistor fabric can be configured to access the memory needed for a processor in accordance with an embodiment of the invention.
Figure 7B:
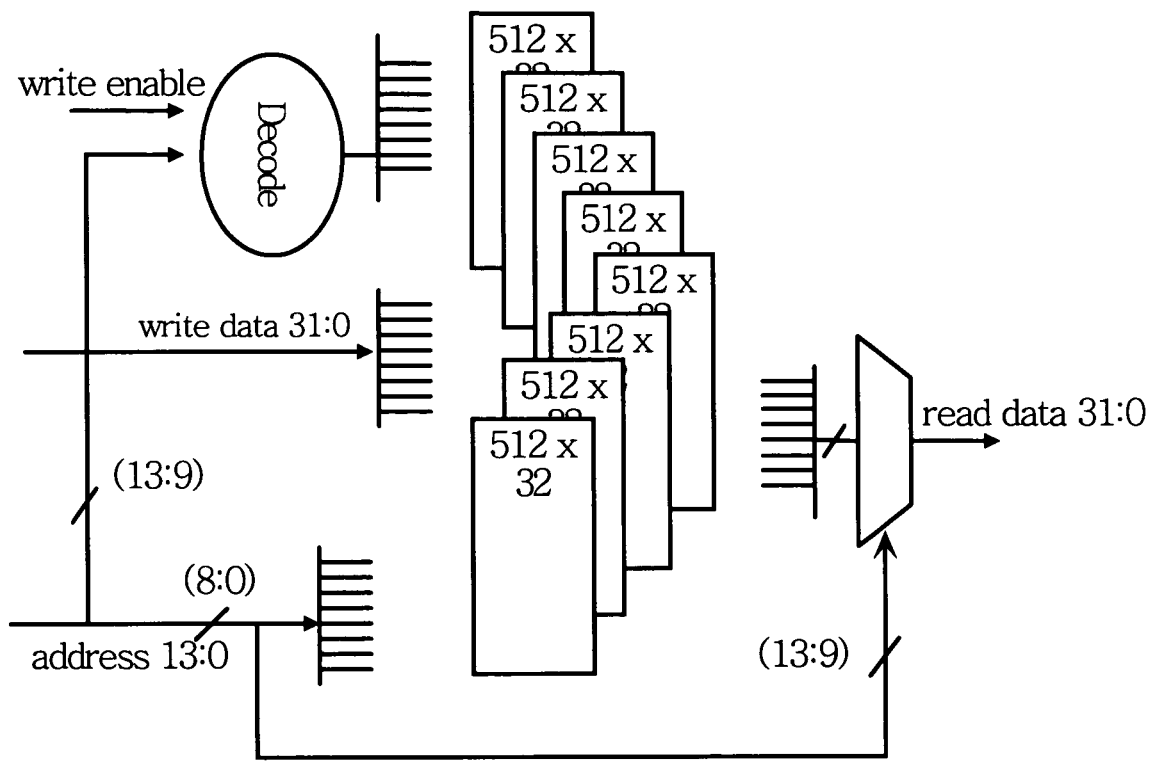

FIGS. 7a and 7b illustrate yet another embodiment of a memory configuration and memory logic for a processor derived from the basic slice of FIG. 4. The processor implemented in FIGS. 7a and 7b uses only a 32 bit wide tightly coupled memory 720 and 750 for both instructions and data created from embedded memories 422-436 and memory blocks 452-468, respectively. Other memory blocks 438\*, **442\*-448\*, 470\*-478\*, and 484\*-490\* may be tied off or used for some performance enhancing registers. FIG. 7b provides an example of a port that can access the tightly coupled memory 720, 750 of processor 3**. Of course, there would be one port for the tightly coupled memory containing the instructions and another port for the tightly coupled memory containing data.

Figure 8:
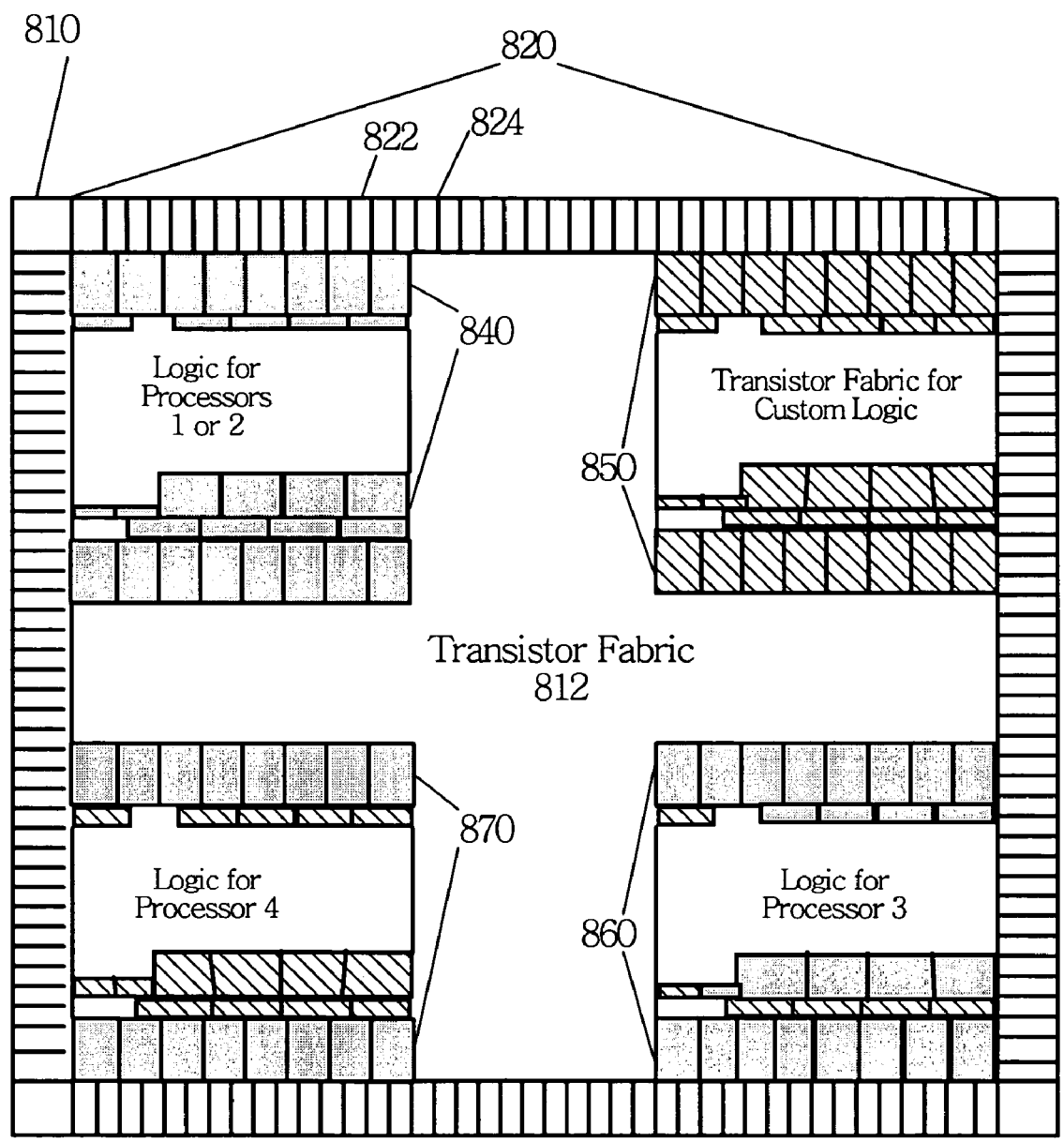
FIG. 8 is an example of an integrated circuit having different configurations of the same memory superset for multiple processors embodied in a slice to be made into a semiconductor product in accordance with features of the invention. It is suggested that FIG. 8 be printed on the face of the patent.

FIG. 8 is a representation of how a flexible memory can be incorporated into a slice for a multiprocessor semiconductor product 810 comprising four memory supersets 840, 850, 860, and 870, each memory superset capable of satisfying the memory requirements for each of the possible processors that may be selected. Once, the logic has been configured on the slice 810, the memory and logic 840 in the upper left can be allocated for processors 1 or 2. Similarly, memory and logic 860 can be allocated for processor 3 in the example provided, and memory and logic 870 is allocatable for processor 4. Memory and logic 850 can be considered a "landing zone" of memory and/or registers that can be customized for other logic and other uses, an example of which may be performance enhancing registers as set forth in U.S. Ser. No. 10/465,186 filed 19 Jun. 2003 entitled DESIGNING AND TESTING THE INTERCONNECTION OF ADDRESSABLE DEVICES OF INTEGRATED CIRCUITS. The edges 820 of the semiconductor slice 810 may comprise a multitude of I/O buffer ports, two of which are labeled 822 and 824. These I/O buffer ports may either be embedded as hardmacs, preferably, or may be configured from the transistor fabric 812.

Figure 9:
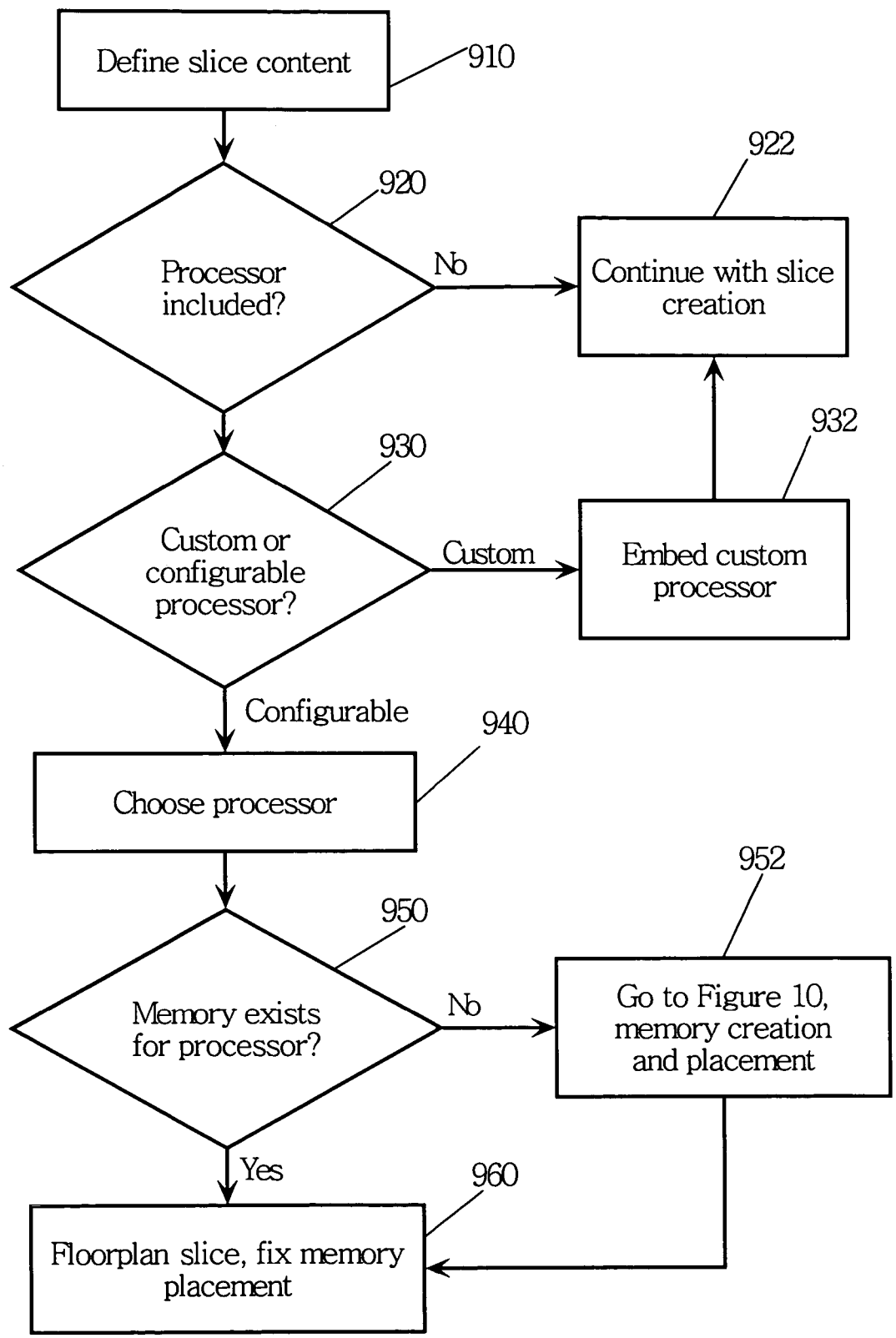
FIG. 9 is a simplified flow chart of the process by which a slice can be created having a superset of memory allocated for a generic processor in accordance with an embodiment of the invention.

FIG. 9 is a simplified flow chart of the process by which the memory allocation tool installed on a computer can be used during creation of the slice to determine its content. At step 910, the content of a slice that can be configured into a variety of semiconductor products is determined, oft times through a general specification from a marketing department of a semiconductor product company. At step 920, an inquiry is made to determine if the slice is to include a processor; if no, then at step 922, slice creation continues. If yes, however, that a processor will be included in the slice, then at step 930, the process ascertains whether the processor is a full custom processor as in an ASSP or is a configurable processor. If the processor is a custom processor, then at step 932, the custom processor is embedded in the slice and slice creation continues to step 922. If a configurable processor is selected to be included in the slice at step 930, then at step 940, the processor configuration is selected. At step 950, it is determined if the memory configuration for the selected processor exists within the slice or not. If the memory does not exist, then at step 952 memory creation and placement is deferred to step 1010 in FIG. 10. If the memory configuration for the processor exists, then at step 960, the memory is placed and the floorplan of the slice is determined.

Figure 10:
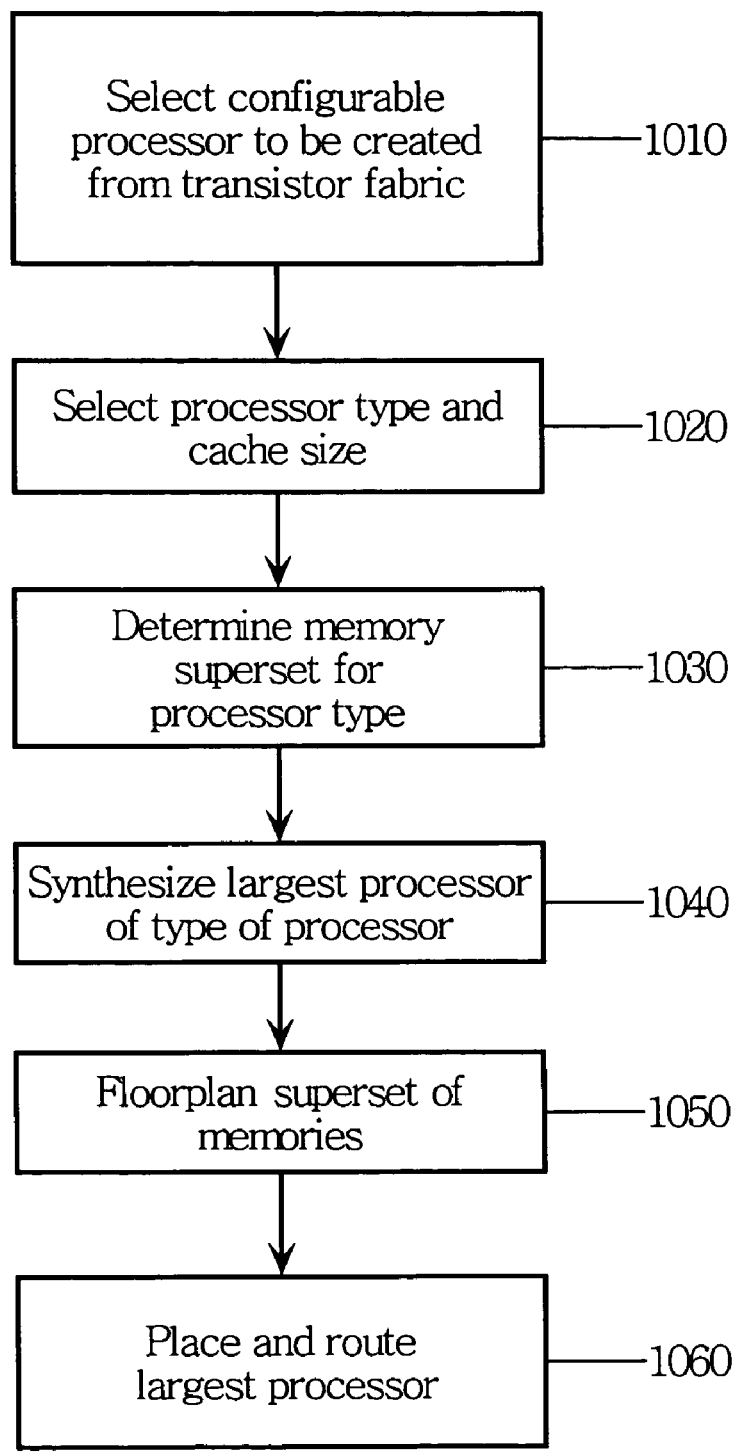
FIG. 10 is a simplified flow chart of the placement and routing of one generic processor and its accompanying memory superset that is capable of accommodating the various instances of the generic processor type in accordance with an embodiment of the invention.

FIG. 10 is a simplified flow chart of how the amount and placement of memory and a processor are determined for a slice once a processor has been selected from the process of FIG. 9. At step 1010, presuming from FIG. 9 that a processor will be included in the slice, then a range of processors and caches/registers/memory sets corresponding to the selected processor range are selected at step 1020 and evaluated at step 1030 to determine the memory superset that can accommodate the range of the multiple embodiments of the processors. An example of this evaluation was presented earlier with respect to the four different processors of the table ranging from a six-stage pipelined processor having both an instruction and data cache, corresponding registers and addresses to a processor having only tightly coupled memory. At step 1040, the transistor fabric is sized to accommodate the largest processor which is then synthesized by converting its RTL code into its netlist of logic gates. At step 1050, the memory superset is created in the floorplan of the slice. At step 1060, EDA tools are used to place and route the largest processor on the slice.

Figure 11:
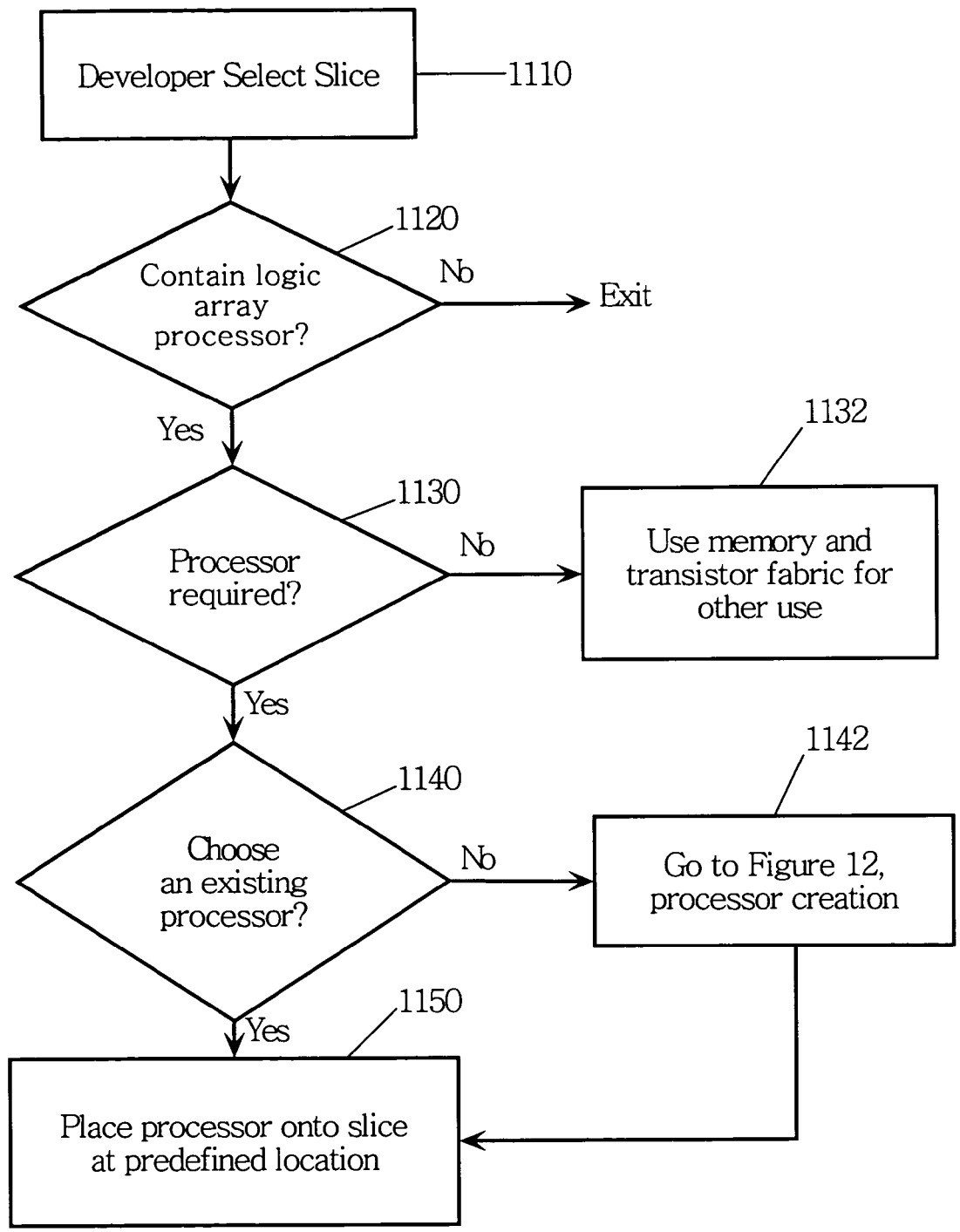
FIG. 11 is a simplified flow chart of how the slice embodying a generic processor and its accompanying superset of memory can be further developed by a chip designer.

FIG. 11 is a simplified flow chart of how a slice, once created, can be used by a chip developer who selected a slice to customize, as in step 1110. Recall that the slice has the memory superset with the capability to program and use the memory subset and the transistor fabric of slice for the several processors. Of course, once a slice is selected, then an inquiry is made if the slice contains a processor, as in step 1120. If not, the process ends. Presuming, however, that the developer chose the slice because she/he wanted a particular processor type and a corresponding memory superset, such as in step 1130. If the processor type and memory subset are included in the slice, then at step 1150, the developer can simply place the processor onto the slice at the predetermined location and the memory superset will be mapped to the particular processor. If, however, the developer desires features of the slice other than the processors of a type and/or the memory superset, then at step 1132, the slice and its transistor fabric can be used for other purposes. One advantage of the flexible memory within the slice is its versatility so that the memory blocks can be configured for other internal or external processing functions.

Figure 12:
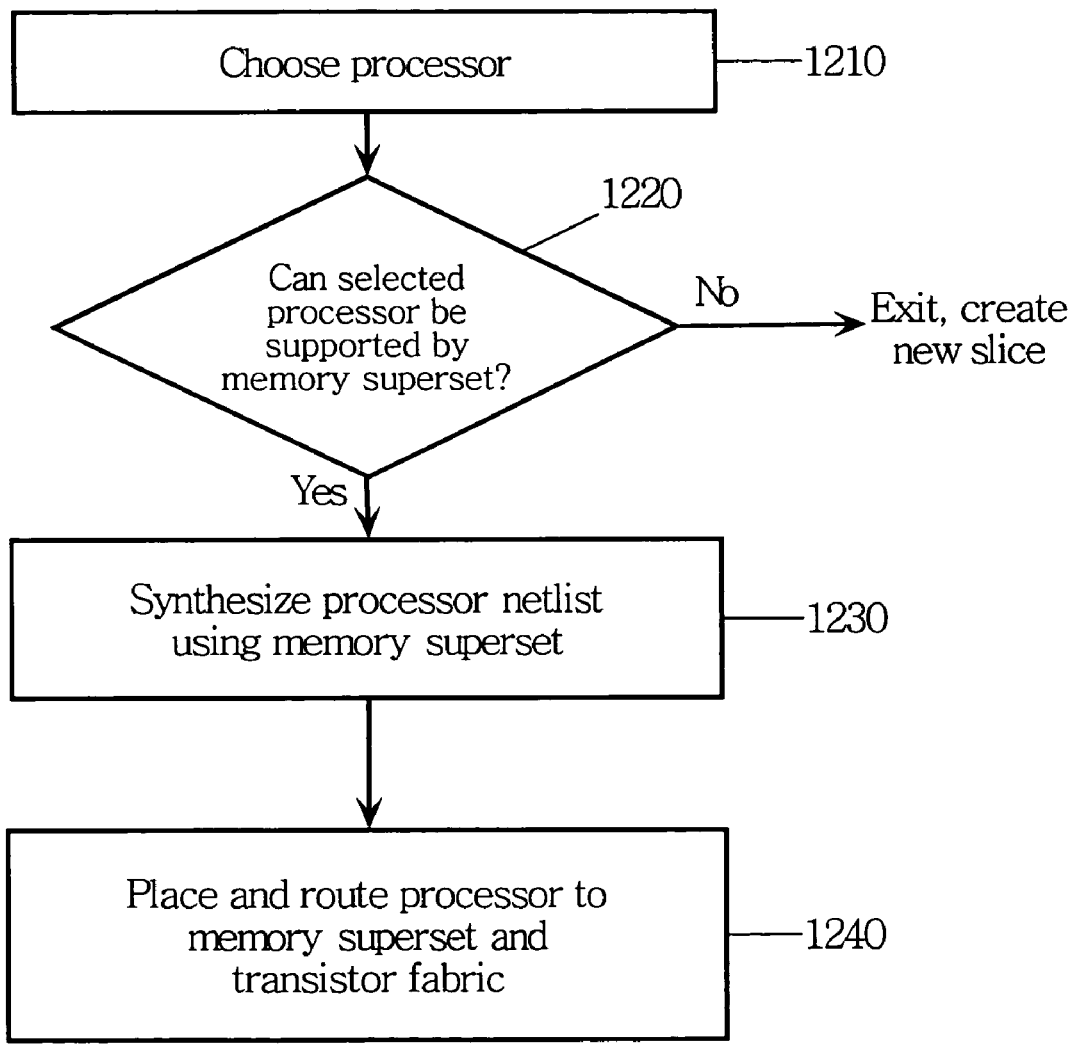
FIG. 12 is a simplified flow chart of how a chip designer can create and map a specific processor and memory requirements into a slice having a memory superset in accordance with an embodiment of the invention.

On the other hand, if the designer of the semiconductor product wants to take advantage of the embedded memory superset but elects not to use any embodiments of the generic processor type preplaced into the slice, then at step 1142, the flow is directed to step 1210 of FIG. 12 to create a different processor. At step 1210, the chip developer chooses a processor. An inquiry is made at step 1220, to determine if the memory superset can support the chosen processor's memory requirements. If so, then at step 1230, the processor netlist is synthesized from the transistor fabric and the embedded memory of the slice mapped for the processor's memory requirements. At step 1240, the processor is placed and the memory is routed to the processor.

Thus, what has been envisioned is a method to determine the maximum flexibility for allocatable memory of a slice. Basically, a range of processors that could be included in the slice is given. Given several embodiments of the processor, the largest common memory that will serve all the memory/register needs of all the processors in the range is determined. That memory superset and the largest and/or most complex processor are then embedded into the slice. The slice, of course, has the capability to turn off the processor and/or different memory blocks and use the memory/registers and/or hardmacs and/or transistor fabric of the slice for other processing and/or memory functions as well. Thus, while various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to design an integrated semiconductor product, comprising:
    (a) inputting a description of a range of processing functions into a slice definition, the slice definition comprising a transistor fabric, and/or at least one hardmac memory;
    (b) determining if the range of processing functions has a plurality of memory requirements; and
    (c) determining a largest common memory that can satisfy the plurality of memory requirements; and
    (d) including the largest common memory into the slice definition.

2. The method of claim 1, further comprising embedding the largest common memory into the at least one hardmac memory.

3. The method of claim 2, further comprising:
    (a) embedding at least one embodiment of the range of processing functions into the slice definition.

4. The method of claim 1, further comprising:
    (a) generating register transfer logic from the transistor fabric so that one of the range of processing functions can use a first portion of the largest common memory.

5. The method of claim 4, wherein the register transfer logic further comprises logic for a port to access the first portion of memory used by the one of the range of processing functions.

6. The method of claim 5, wherein the first portion of the largest common memory to be used by one of the range of processing functions is an instruction cache.

7. The method of claim 6, wherein a second portion of the largest common memory to be used by one of the range of processing functions contains tags/addresses for instructions in the instruction cache.

8. The method of claim 6, wherein a second portion of the largest common memory to be used by one of the range of processing functions is a valid register indicating valid and/or invalid instructions in the instruction cache.

9. The method of claim 4, wherein the first portion of the largest common memory to be used by one of the range of processing functions is a data cache.

10. The method of claim 9, wherein a second portion of the largest common memory to be used by one of the range of processing functions contains tags/addresses for data in the data cache.

11. The method of claim 9, wherein a second portion of the largest common memory to be used by one of the range of processing functions is a valid register indicating which data in the data cache is or is not valid.

12. The method of claim 4, wherein a first portion of the largest common memory to be used by one of the range of processing functions is a tightly coupled memory.

13. The method of claim 4, further comprising:
(a) identifying a second portion of the largest common memory not used by one of the range of processing functions;
(b) generating register transfer logic to create an additional function from the transistor fabric;
(c) generating register transfer logic to create an additional register and/or memory from the second portion of the largest common memory;
(d) generating the interconnect register transfer logic to connect the additional register and or memory to the additional function;
(e) adding the interconnect and the generated register transfer logic to the slice definition.

14. An article of manufacture, comprising a data storage medium tangibly embodying a program of machine readable instructions executable by an electronic processing apparatus to perform method steps for operating an electronic processing apparatus, said method steps comprising the steps of:
(a) reading a plurality of input files relating to a plurality of embodiments of processing functions that could be incorporated into a design of a partially manufactured semiconductor product having a transistor fabric;
(b) determining the largest common superset of memory that can be used by all of the plurality of embodiments of the processing function;
(c) embedding the superset of memory into the design of the partially manufactured semiconductor product;
(d) generating a plurality of output files to configure the embedded memory superset for use by a selected embodiment of the plurality of processing functions; and
(e) updating the design of the partially manufactured semiconductor product with the output files.

15. The article of manufacture of claim 14, wherein the output files comprise register transfer logic to tie off any portion of the embedded memory superset not used by the selected embodiment of the plurality of processing functions.

16. The article of manufacture of claim 14, wherein the output files comprise register transfer logic to convert a portion of the transistor fabric to access the embedded memory superset used by the selected embodiment of the plurality of processing functions.

17. A method of configuring a partially manufactured semiconductor product having a transistor fabric and embedded with a memory superset capable of satisfying the memory/register requirements of all of a range of processing functions, the method of configuring comprising the steps of:
(a) selecting one processing function from the range of processing functions;
(b) determining how the memory superset is to be apportioned to the selected one processing function;
(c) apportioning the memory superset;
(d) tying off that portion of the memory superset that is not apportioned;
(e) determining how to access the apportioned memory superset;
(f) creating logic within the transistor fabric to access the apportioned memory superset.

18. A system to design a partially manufactured semiconductor product, comprising:
(a) means to receive a functional description of the partially manufactured semiconductor product;
(b) means to determine if the functional description may include a range of processing functions;
(c) means to evaluate the memory and/or register requirements of the range of processing functions;
(d) means to specify a memory superset configurable for a memory and/or register requirement for all of the processing functions in the range; and
(e) means to embed the memory superset into the partially manufactured semiconductor product.

19. The system of claim 18, further comprising:
(a) means to configure the memory superset into the memory and/or register requirement for one or more of the processing functions in the range;
(b) means to create the logic necessary to access the memory and/or register requirement for one or more of the processing functions in the range.

20. A partially manufactured semiconductor product, comprising:
(a) a plurality of functional areas, at least one of the functional areas embedded into the semiconductor product as a configurable superset of semiconductor memory;
(b) at least another of the functional areas reserved for one of a range of processing circuits, each one of the range of processing circuits capable of using all or a portion of the configurable superset of semiconductor memory;
(c) configuration logic capable of fulfilling a memory/register requirement of at least one of the range of processing circuits from the configurable superset of semiconductor memory; and
(d) port logic capable of accessing the memory/register requirement fulfilled from the configurable superset of semiconductor memory.

* * * * *